US011236026B1

(12) United States Patent
Duff et al.

(10) Patent No.: US 11,236,026 B1
(45) Date of Patent: Feb. 1, 2022

(54) FERTIGATION PROCESS (71) Applicant: ROSEN'S, INC., Liberty, MO (US)

(72) Inventors: Michael G. Duff, Manhattan, KS (US); Tommy Kent Woodall, Liberty, MO (US)

(73) Assignee: Rosen's, Inc., Liberty, MO (US)

(*) Notice: Subject to any disclaimer, the term of this patent is extended or adjusted under 35 U.S.C. 154(b) by 0 days.

(21) Appl. No.: 17/071,400

(22) Filed: Oct. 15, 2020

(51) Int. Cl.
C05G 3/90 (2020.01)
C05G 5/20 (2020.01)
A01C 21/00 (2006.01)
A01C 23/04 (2006.01)
C05C 9/00 (2006.01)
A01G 25/02 (2006.01)
A01G 22/20 (2018.01)

(52) U.S. Cl.
CPC ............. C05G 3/90 (2020.02); A01C 21/005 (2013.01); A01C 23/042 (2013.01); A01G 22/20 (2018.02); A01G 25/02 (2013.01); C05C 9/00 (2013.01); C05G 5/20 (2020.02)

(58) Field of Classification Search
None
See application file for complete search history.

(56) References Cited

U.S. PATENT DOCUMENTS 1,966,783 A * 7/1934 Balaam ................. A01G 25/09 239/737
9,266,789 B2 * 2/2016 Ortiz-Suarez ............ C05G 3/90
9,637,420 B2 5/2017 McKnight et al.
2015/0143860 A1 * 5/2015 McKnight ................. C05C 9/00 71/28
2016/0107947 A1 * 4/2016 McKnight ................. C05C 9/00 71/27
2017/0036969 A1 2/2017 Nave et al.
2017/0050895 A1 * 2/2017 Ortiz-Suarez ........... C05C 11/00
2018/0002246 A1 * 1/2018 Liu ....................... C09K 15/324
2019/0092704 A1 * 3/2019 Nave ......................... C05C 1/00
(Continued)

FOREIGN PATENT DOCUMENTS

CN 102875238 1/2013
CN 106588517 4/2017
(Continued)

OTHER PUBLICATIONS

Chakrabarti et al., "Effects of dicyandiamide, farmyard manure and irrigation on crop yields and ammonia volatilization from an alluvial soil under a rice (Oryza sativa L.)-wheat (Triticum aestivum L.) cropping system", Biology and Fertility of Soils, Oct. 2002 (9 pgs).

(Continued)

Primary Examiner — Wayne A Langel
(74) Attorney, Agent, or Firm — Stinson LLP (57) ABSTRACT The present disclosure generally provides a fertigation process comprising providing a nitrification inhibitor composition; providing a urea ammonium nitrate fertilizer composition; combining the nitrification inhibitor composition with the fertilizer composition; and applying the combined composition during a growing cycle of a crop using an overhead irrigation system. The present disclosure also relates to this fertigation process wherein the nitrification inhibitor comprises dicyandiamide and dimethyl sulfoxide and the crop is corn.

26 Claims, 7 Drawing Sheets (56) References Cited

U.S. PATENT DOCUMENTS

| | | | |
|---|---|---|---|
| 2019/0124917 A1* | 5/2019 | Bobeck | C05C 7/00 |
| 2019/0194085 A1* | 6/2019 | McKnight | C05C 3/00 |
| 2019/0256437 A1* | 8/2019 | McKnight | C05G 3/90 |
| 2019/0300452 A1* | 10/2019 | Chen | C05C 9/00 |
| 2020/0022372 A1* | 1/2020 | Garnier-Amblard | C05C 9/02 |
| 2020/0102255 A1* | 4/2020 | Feng | A01C 21/00 |
| 2021/0276930 A1* | 9/2021 | Nesvadba | C05G 5/20 |

FOREIGN PATENT DOCUMENTS

| | | | |
|---|---|---|---|
| CN | 106631634 | 5/2017 | |
| CN | 107344903 | * 11/2017 | C05C 9/00 |
| CN | 107793249 | 3/2018 | |
| CN | 109503273 | 3/2019 | |
| CN | 109608264 | 4/2019 | |
| CN | 109627108 | 4/2019 | |
| CN | 109678585 | 4/2019 | |
| CN | 111233585 | 6/2020 | |
| EP | 1378499 | 1/2004 | |
| JP | 2017205098 | 11/2017 | |

OTHER PUBLICATIONS

Label of product, "FUNCTION™", Nitrogen Fertilizer Additive, Rosen's Inc., Sales of the FUNCTION product occurred prior to Oct. 15, 2019.

Exhibit A, experimental tests were conducted in 2015 and 2017-2019.

* cited by examiner

FERTIGATION PROCESS

FIELD OF THE INVENTION

The present invention generally relates to various processes for fertigation comprising the application of a nitrification inhibitor composition.

BACKGROUND OF THE INVENTION

Urea ammonium nitrate (UAN) fertilizers are useful for aiding in crop growth and development. The fertilizers may be typically applied through drip irrigation (i.e. subsurface irrigation), pivot irrigation, sprinkler systems, etc.

Urea ammonium nitrate fertilizers are generally applied throughout the growing season in order to supply a source of nitrogen to aid in crop growth. However, nitrate from the urea ammonium nitrate fertilizer may leach into the soil and enter the ground water. High levels of nitrate in the ground water are undesirable and may be subject to regulation by the relevant governing bodies. In addition to environmental concerns, once the fertilizer has leached through the soil profile, the crop is no longer able to utilize the nitrogen for use in crop growth and development.

Therefore, there remains a need for compositions comprising a urea ammonium nitrate fertilizer and methods of crop treatment (e.g., fertigation) that reduce the total amount of leaching of the nitrate into the soil and allow for more of the nitrogen to be accessible by the crop for growth and development.

BRIEF SUMMARY OF THE INVENTION

The present invention relates to various processes for fertigation comprising the application of urea ammonium nitrate fertilizer(s) in combination with a nitrification inhibitor composition. Various aspects of the present invention include processes wherein the nitrification inhibitor composition comprises dicyandiamide and dimethyl sulfoxide.

Certain aspects of the present invention include fertigation processes that comprise providing a nitrification inhibitor composition comprising dicyandiamide and dimethyl sulfoxide; providing a urea ammonium nitrate fertilizer composition; combining the nitrification inhibitor composition with the fertilizer composition; and applying the combined composition during a growing cycle of a crop using an overhead irrigation system. In further aspects of the present invention, the nitrification inhibitor composition consists essentially of the dicyandiamide and the dimethyl sulfoxide. In other aspects of the present invention, the combined composition consists essentially of the nitrification inhibitor composition and the fertilizer composition. In yet another aspect of the present invention, the combined composition consists essentially of the nitrification inhibitor composition and the fertilizer composition, and water. In certain embodiments, the crop is corn.

The present invention further relates to various compositions used in or processes that incorporate these fertigation processes.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

The present invention is directed to fertigation processes. The fertigation processes of the present invention comprise providing a nitrification inhibitor composition, providing a urea ammonium nitrate fertilizer composition, and applying the compositions during a growing cycle of a corn crop. The nitrification inhibitor composition and urea ammonium nitrate fertilizer composition may be applied simultaneously as separate compositions, combined prior to application, or applied to the crop at different times. The nitrification inhibitor and urea ammonium nitrate fertilizer composition may be applied using an overhead irrigation system.

In certain embodiments of the present invention, a nitrification inhibitor composition and a urea ammonium nitrate fertilizer composition are combined to form a combined composition. In one embodiment, the combined composition consists essentially of the nitrification inhibitor composition and the fertilizer composition. In another embodiment, the combined composition comprises the nitrification inhibitor composition, the fertilizer composition, and water. In still a further embodiment, the combined composition consists essentially of the nitrification inhibitor composition, the fertilizer composition, and water.

As used herein, a combined composition encompasses a composition in which the nitrification inhibitor composition and urea ammonium nitrate fertilizer composition are present together in the irrigation system.

In various embodiments, the fertigation processes comprise providing a nitrification inhibitor composition comprising dicyandiamide and dimethyl sulfoxide; providing a urea ammonium nitrate fertilizer composition; combining the nitrification inhibitor composition with the fertilizer composition; and applying the combined composition during a growing cycle of a corn crop using an overhead irrigation system.

In one embodiment, the fertigation processes comprise providing a nitrification inhibitor composition comprising dicyandiamide and dimethyl sulfoxide; providing a urea ammonium nitrate fertilizer composition; combining the nitrification inhibitor composition with the fertilizer composition; and applying the combined composition during a growing cycle of a corn crop using an overhead irrigation system.

In certain embodiments, the fertigation process comprises applying the nitrification inhibitor composition, urea ammonium nitrate fertilizer composition, or combination thereof by an overhead irrigation system. Overhead irrigation system(s) are understood to include, but not be limited to, pivot, linear, sprinkler and other overhead irrigation systems.

The fertigation process of the present invention surprisingly results in increased crop yield as compared to known fertigation processes and processes using nitrification inhibitors, and which can be achieved with surprisingly low usage rates of the nitrification inhibitor composition.

Urea ammonium nitrate is typically applied throughout the growing season in corn and other crops, and is known to supply nitrogen to the aid in crop for growth and development. Without being bound to any theory, it is believed that the fertigation process of the present invention slows the natural process of nitrification and allows for increased fertilizer efficiency. Specifically, the nitrification inhibitor is believed to maintain the ammonium form of the fertilizer components and limit the conversion of the ammonium form to the nitrate form. Typically, such conversion takes place via bacteria in the fertilizer or crop environment. Additionally, it is believed that nitrate more readily leaches into the soil profile, and potentially into the ground water. By limiting the rate of nitrification of the urea ammonium nitrate fertilizer composition, the present invention is believed to delay the formation of negative ions (e.g., nitrites and/or nitrates) from the ammonium nitrate fertilizer. This delayed rate of nitrification, in turn, limits the amount of the composition that leaches into the soil profile farther away from the crop plant, thus allowing for increased crop uptake of the fertilizer and limiting the environmental impact associated with any such leaching.

In one embodiment, the fertigation process comprises injecting the nitrification inhibitor composition, urea ammonium nitrate fertilizer composition, or combination thereof into the irrigation system. In certain embodiments, the process comprises combining the nitrification inhibitor composition and urea ammonium nitrate fertilizer composition prior to injection. In certain other embodiments, the nitrification inhibitor composition and urea ammonium nitrate fertilizer composition are separately injected, simultaneously or at different times, resulting in a combined composition. When the fertigation process comprises injection into the irrigation system, the process may comprise three-stage application, proportional application, quantitative application, or any other method known in the art that is suitable for injection into an irrigation system.

In certain embodiments, the process comprises combining the nitrification inhibitor composition with the urea ammonium nitrate fertilizer composition and applying the combined composition in one irrigation cycle. In another embodiment, the process comprises applying the combined composition from 1 to 10 times during the growing cycle of the crop. For example, from 1 to 9, from 1 to 8, from 1 to 7, from 1 to 6, from 1 to 5, from 1 to 4, from 1 to 3, or from 1 to 2 times during the growing cycle of the crop. In certain embodiments, the process comprises applying the combined composition 1, 2, 3, 4, 5, 6, 7, 8, 9, or 10 times during the growing cycle of the crop.

In various embodiments, the process comprises combining the nitrification inhibitor composition with the urea ammonium nitrate fertilizer composition and applying the combined composition at a certain point during the stages of crop (e.g., corn) growth. For example, the step of applying the compositions or combined composition may be done at the stage of corn growth of preemergence, VE (emergence), V1, V2, V3, V(n), VT, R1, R2, R3, R4, R5, and/or R6. The step of applying the compositions or combined composition may be done prior to the stage of corn growth of VE (emergence), V1, V2, V3, V(n), VT, R1, R2, R3, R4, R5, and/or R6. The step of applying the compositions or combined composition may be done after the stage of corn growth of preemergence, emergence VE, V1, V2, V3, V(n), VT, R1, R2, R3, R4, R5, and/or R6. VE is understood to be the vegetative stage of emergence. VT is understood to be the vegetative stage of tasseling. V(n) is understood to be the vegetation stage of the nth leaf collar. R1 is understood to be the reproductive stage of silking. R2 is understood to be the reproductive stage of blistering. R3 is understood to be the reproductive stage of milking. R4 is understood to be the reproductive stage of doughing. R5 is understood to be the reproductive stage of denting. R6 is understood to be the reproductive stage of maturity.

Nitrification Inhibitor Composition

The nitrification inhibitor composition of the present invention comprises dicyandiamide and dimethyl sulfoxide. In certain embodiments, the nitrification inhibitor composition consists essentially of dicyandiamide and dimethyl sulfoxide.

In one embodiment, the process comprises providing the nitrification inhibitor composition at a rate of from about 0.25 vol. % to about 5 vol. %, from about 0.5 vol. % to about 5 vol. %, from about 1 vol. % to about 5 vol. %, from about 2 vol. % to about 5 vol. %, from about 3 vol. % to about 5 vol. %, or from about 4 vol. % to about 5 vol. % based on the total volume applied during an irrigation cycle of the fertigation process. In another embodiment, the process comprises providing the nitrification inhibitor composition at a rate of from about 0.5 vol. % to about 4 vol. %, from about 0.5 vol. % to about 3 vol. %, from about 0.5 vol. % to about 2 vol. %, or from about 1 vol. % to about 2 vol. % based on the total volume applied during an irrigation cycle of the fertigation process.

In certain embodiments, the fertigation process comprises utilizing a volumetric rate of the nitrification inhibitor composition to the urea ammonium nitrate fertilizer of from about 0.25% to about 5%, from about 0.25% to about 4%, from about 0.25% to about 3%, from about 0.25% to about 2%, from about 0.25% to about 1%, or from about 0.25% to about 0.5%. In another embodiment, the fertigation process comprises utilizing a volumetric rate of the nitrification inhibitor composition to the urea ammonium nitrate fertilizer of from about 0.5% to about 5%, from about 0.5% to about 4%, from about 0.5% to about 3%, from about 0.5% to about 2%, or from about 0.5% to about 1%. In a further embodiment, the fertigation process comprises utilizing a volumetric rate of the nitrification inhibitor composition to the urea ammonium nitrate fertilizer of from about 1% to about 5%, from about 1% to about 4%, from about 1% to about 3%, or from about 1% to about 2%.

In one embodiment, dicyandiamide comprises about 45 wt. % or less, about 40 wt. % or less, about 35 wt. % or less, about 30 wt. % or less, about 25 wt. % or less, about 20 wt. % or less, about 15 wt. % or less, about 10 wt. % or less, about 9 wt. % or less, about 8 wt. % or less, about 7 wt. % or less, about 6 wt. % or less, about 5 wt. % or less, about 4 wt. % or less, about 3 wt. % or less, about 2 wt. % or less, or about 1 wt. % or less of the nitrification inhibitor composition. In one embodiment, dicyandiamide comprises from about 5 wt. % to about 50 wt. %, from about 10 wt. % to about 50 wt. %, from about 15 wt. % to about 50 wt. %, from about 20 wt. % to about 50 wt. %, or from about 25 wt. % to about 50 wt. % of the nitrification inhibitor composition. For example, in certain embodiments, dicyandiamide comprises from about 1 wt. % to about 45 wt. %, from about 2 wt. % to about 45 wt. %, from about 3 wt. % to about 45 wt. %, from about 4 wt. % to about 45 wt. %, from about 5 wt. % to about 45 wt. %, from about 5 wt. % to about 40 wt. %, from about 10 wt. % to about 40 wt. %, from about 15 wt. % to about 40 wt. %, from about 20 wt. % to about 40 wt. %, from about 25 wt. % to about 40 wt. %, or from about 25 wt. % to about 35 wt. % of the nitrification inhibitor composition. In yet another embodiment, dicyandiamide comprises from about 10 wt. % to about 35 wt. %, from about 15 wt. % to about 35 wt. %, from about 20 wt. % to about 35 wt. %, or from about 25 wt. % to about 35 wt. % of the nitrification inhibitor composition. In certain embodiments, the dicyandiamide comprises about 30 wt. % of the nitrification inhibitor composition.

Dimethyl sulfoxide serves as a solvent for the dicyandiamide in the nitrification inhibitor composition. In certain embodiments, the dimethyl sulfoxide solvent comprises at least about 95%, at least about 96%, at least about 97%, at least about 98%, at least about 99% of dimethyl sulfoxide. In one embodiment, the dimethyl sulfoxide solvent comprises at least about 99.9% of dimethyl sulfoxide. In certain embodiments, the dimethyl sulfoxide comprises at least about 35 wt. %, at least about 40 wt. %, at least about 45 wt. %, at least about 50 wt. %, at least about 55 wt. %, at least about 60 wt. %, at least about 65 wt. %, at least about 70 wt. %, at least about 75 wt. %, or at least about 80 wt. % of the nitrification inhibitor composition. For example, in certain embodiments, the dimethyl sulfoxide comprises from about 35 wt. % to about 80 wt. %, from about 40 wt. % to about 80 wt. %, from about 45 wt. % to about 80 wt. %, from about 50 wt. % to about 80 wt. %, from about 55 wt. % to about 80 wt. %, from about 60 wt. % to about 80 wt. %, from about 65 wt. % to about 80 wt. %, or from about 65 wt. % to about 75 wt. % of the nitrification inhibitor composition.

In certain embodiments, the nitrification inhibitor composition is applied at a rate of from about 10 to about 15 oz., from about 11 to about 15 oz., from about 11 to about 14 oz., from about 12 to about 14 oz., or from about 12 to about 13 oz. per acre per irrigation cycle. In one embodiment, the nitrification inhibitor composition is applied at a rate of about 12.8 oz. per acre per irrigation cycle.

It was surprisingly found that application of the nitrification inhibitor composition at these rates, which are much lower that the application of rate of nitrification inhibitors when applied through other means, such as 2×2, side-dress or soil applied, achieves the yield benefits discussed above and in the examples below.

Fertilizer Composition

The urea ammonium nitrate fertilizer composition of the present invention may comprise any commercially available urea ammonium nitrate fertilizer. Typically, urea ammonium nitrate fertilizers used for crops (e.g., corn) have a urea ammonium nitrate content of 28% (UAN 28) or 32% (UAN 32). These urea ammonium nitrate fertilizers are readily available from commercial manufacturers.

In one embodiment of the present invention, the urea ammonium nitrate fertilizer composition comprises urea ammonium nitrate with a manufacturer guaranteed nitrogen analysis of from about 10% to about 35%, from about 15% to about 35%, from about 20% to about 35%, from about 25% to about 35%, or from about 30% to about 35%. In another embodiment, the urea ammonium nitrate fertilizer composition comprises urea ammonium nitrate with a guaranteed nitrogen analysis of from about 25% to about 34%, from about 26% to about 34%, from about 27% to about 33%, or from about 28% to about 32%. In another embodiment, the urea ammonium nitrate fertilizer composition comprises urea ammonium nitrate with a guaranteed nitrogen analysis of from about 25% to about 33% or from about 25% to about 32%.

In one embodiment, the fertilizer composition comprises urea ammonium nitrate and water. In another embodiment, the fertilizer composition consists essentially of urea ammonium nitrate and water.

In certain embodiments, the urea ammonium nitrate fertilizer composition is applied at a rate of from about 1 to about 15, from about 1 to about 10, from about 2 to about 10, from about 3 to about 10, from about 4 to about 10, or from about 5 to about 10 gallons per acre per irrigation cycle.

In one embodiments, the process further comprises providing one or more nutrients selected from the group consisting of sulfur, calcium, magnesium, and potassium. The one or more nutrients may be added to the process of the present invention as a separate component or as a part of the fertilizer composition. For example, in one embodiment, the one or more nutrients may be supplied to the process as a separate component by any manner of conventional means including, but not limited to, dry or liquid broadcast applications or fertigation.

The nutrient may be supplied to the process in, for example, elemental, sulfate, oxysulfate, chelated, etc. forms. The nutrient may be supplied to the crop simultaneously with the nitrification inhibitor composition, simultaneously with the urea ammonium nitrate fertilizer composition, simultaneously with a combination of the nitrification inhibitor composition and urea ammonium nitrate fertilizer composition, or may be applied to the crop plant separately from the nitrification inhibitor composition and/or urea ammonium nitrate fertilizer composition.

In further embodiments of the present invention, the one or more nutrients may be supplied the process as a part of the fertilizer composition. For example, in one embodiment, the process of the present invention comprises a urea ammonium nitrate fertilizer composition comprising urea ammonium nitrate and a nutrient selected from the group consisting of sulfur, calcium, magnesium and potassium. In another embodiment, the process of the present invention comprises a urea ammonium nitrate fertilizer composition comprising urea ammonium nitrate, sulfur, and water.

In another embodiment, the process of the present invention comprises a urea ammonium nitrate fertilizer composition consisting essentially of the urea ammonium nitrate and a nutrient selected from the group consisting of sulfur, calcium, magnesium and potassium. In another embodiment, the process of the present invention comprises a urea ammonium nitrate fertilizer composition consisting essentially of the urea ammonium nitrate, a nutrient selected from the group consisting of sulfur, calcium, magnesium and potassium, and water. In another embodiment, the urea ammonium nitrate fertilizer composition consists essentially of urea ammonium nitrate, sulfur and water.

In one embodiment, the process of the present invention comprises a nutrient having a manufacturer guaranteed nutrient analysis of from about 0.25% to about 10%, from about 5% to about 10%, from about 1% to about 10%, from about 1% to about 9%, from about 1% to about 8%, from about 1% to about 7%, from about 1% to about 6%, from about 1% to about 5%, or from about 2% to about 5%.

In certain embodiments, the fertigation process of the present invention comprises providing a nitrification inhibitor composition, providing a urea ammonium nitrate fertilizer composition, combining the nitrification inhibitor composition with the urea ammonium nitrate fertilizer composition, and applying the combined composition during the growing cycle of a corn crop to achieve a predetermined application rate of the combination. This allows for improvements in the crop yield and economics of the fertigation process.

The water needs of the crop will primarily dictate the total amount of water applied to a crop during an irrigation cycle, and the number of irrigation cycles applied during a growing season. The amount of fertilizer composition to be applied will be primarily dictated by soil tests and yield goals. Typically, the amounts of water and fertilizer composition to be applied are initially determined, and then the amount of nitrification inhibitor to be added with the fertilizer is calculated. The amount and concentration of the nitrification inhibitor can therefore be particularly tailored to each irrigation cycle. The amount of nitrification inhibitor used in any specific irrigation cycle will depend on the intended total number of irrigation cycles, the concentration of the other components, and any external conditions that may require adjustment of the amount of water, fertilizer or nitrification inhibitor (e.g., total rainfall, soil contents, etc.).

The fertigation process of the present invention may be applied to various crop plants. In certain embodiments, the crop plant comprises corn, grain sorghum, potatoes, small grains or other crops that can utilize urea ammonium nitrate as a nitrogen source. In one embodiment, the crop plant comprises corn.

Having described the invention in detail, it will be apparent that modifications and variations are possible without departing from the scope of the invention defined in the appended claims.

EXAMPLES

The following non-limiting examples are provided to further illustrate the present invention.

Example 1

Field trials of the process of the present invention were conducted in Yuma, Colorado over the course of several growing seasons between the years 2015 and 2019. Data was not collected in the year 2016 due to extreme environmental conditions.

For the years 2015 and 2017, the process comprising combining a nitrification inhibitor composition and a urea ammonium nitrate fertilizer composition and applying the combined composition to a corn crop was compared to a process comprising only a urea ammonium nitrate fertilizer composition.

For the years 2018 and 2019, three processes were tested on a corn crop. The first process was a fertigation process that did not comprise urea ammonium nitrate fertilizer. The second process was a fertigation process that did comprise a urea ammonium nitrate fertilizer. The final process was a fertigation process comprising combining a nitrification inhibitor composition comprising dicyandiamide and dimethyl sulfoxide and a urea ammonium nitrate fertilizer composition, and applying the combined composition to a corn crop using pivot irrigation.

Figure 1:
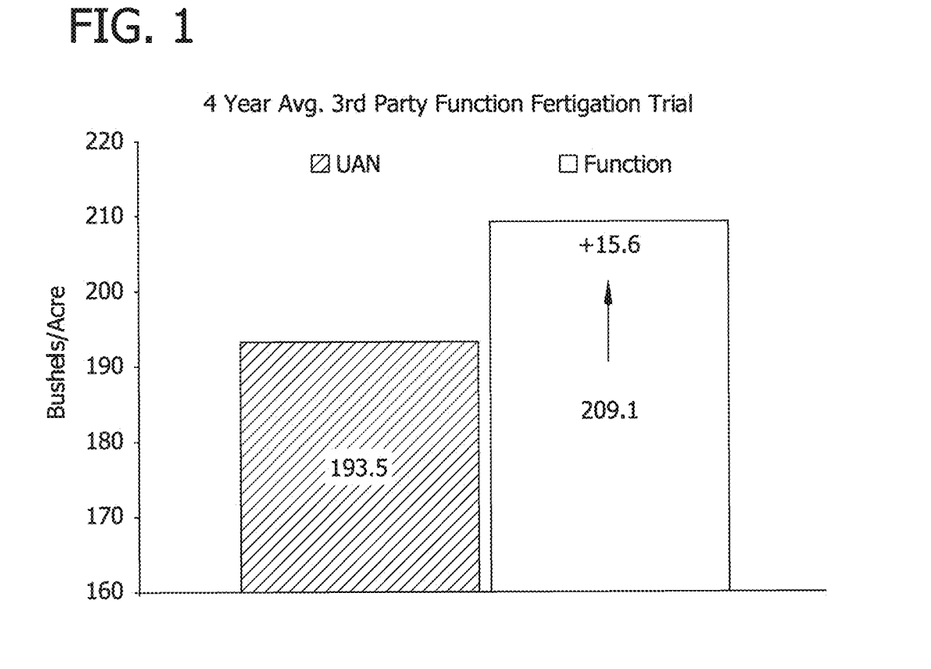
FIG. 1 represents the four-year average of the production of a corn crop when only a urea ammonium nitrate fertilizer composition was used and when a nitrification inhibitor composition was used in combination with a urea ammonium nitrate fertilizer composition.

As demonstrated in FIG. 1, the four-year average of the production of the corn crop increased by more than 15 bushels per acre when a nitrification inhibitor composition was used in combination with a urea ammonium nitrate fertilizer composition. This represented more than an 8% increase in crop yield.

Figure 2:
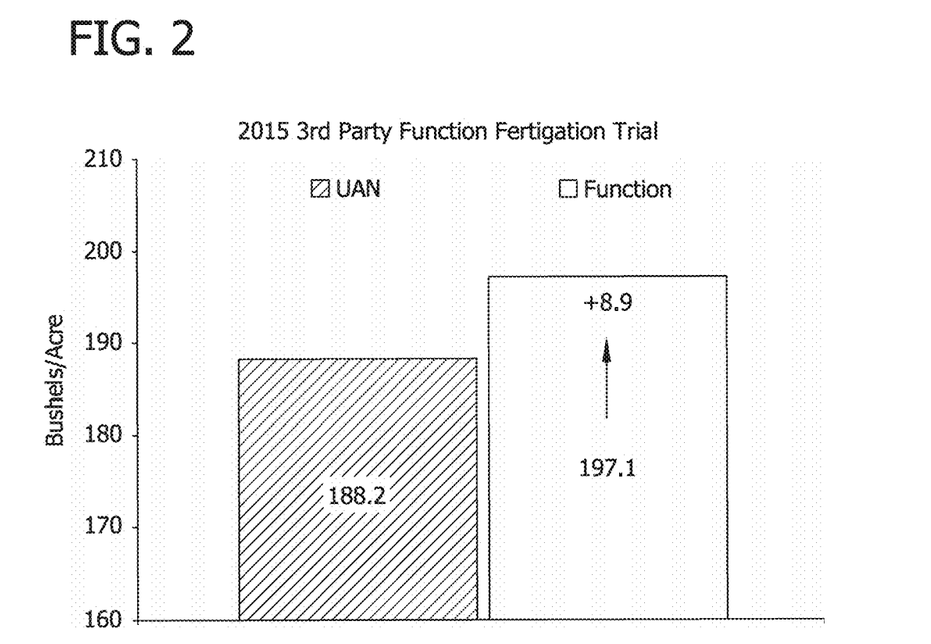
FIG. 2 represents corn crop production data for the year 2015 for a process utilizing a urea ammonium nitrate fertilizer and a process utilizing a nitrification inhibitor composition in combination with a urea ammonium nitrate fertilizer composition.

FIG. 2 reports the corn crop production data for the year 2015. The process utilizing a urea ammonium nitrate fertilizer produced approximately 188.2 bushels per acre. In contrast, the process comprising a nitrification inhibitor composition was used in combination with a urea ammonium nitrate fertilizer composition produced approximately 197.1 bushels per acre, representing a more than 4.5% increase in crop production.

Figure 3:
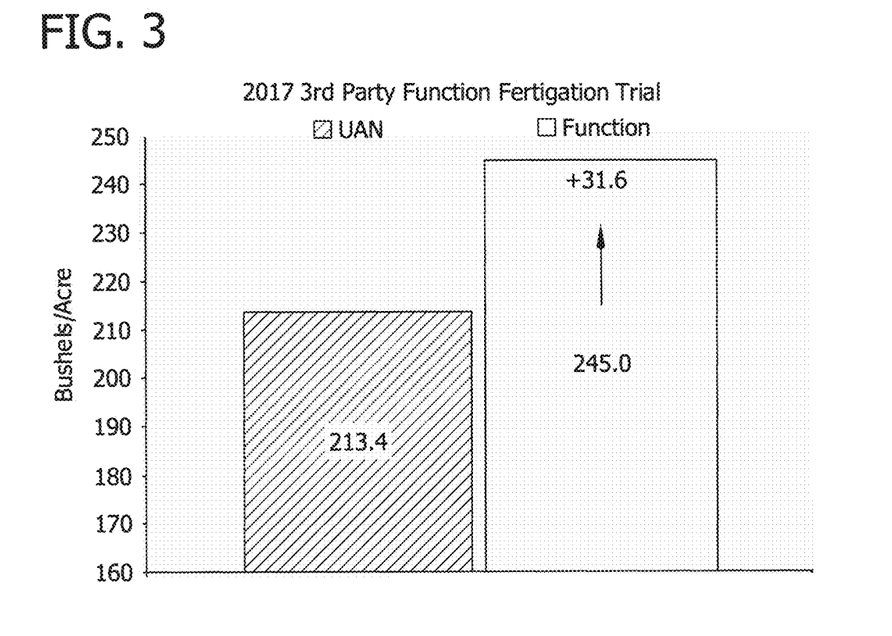
FIG. 3 represents corn crop production data for the year 2017 for a process utilizing a urea ammonium nitrate fertilizer and a process utilizing a nitrification inhibitor composition in combination with a urea ammonium nitrate fertilizer composition.

FIG. 3 reports the corn crop production data for the year 2017. The process utilizing a urea ammonium nitrate fertilizer produced approximately 213.4 bushels per acre. In contrast, the process comprising a nitrification inhibitor composition was used in combination with a urea ammonium nitrate fertilizer composition produced approximately 245.0 bushels per acre, representing a more than 14.5% increase in crop production.

Figure 4:
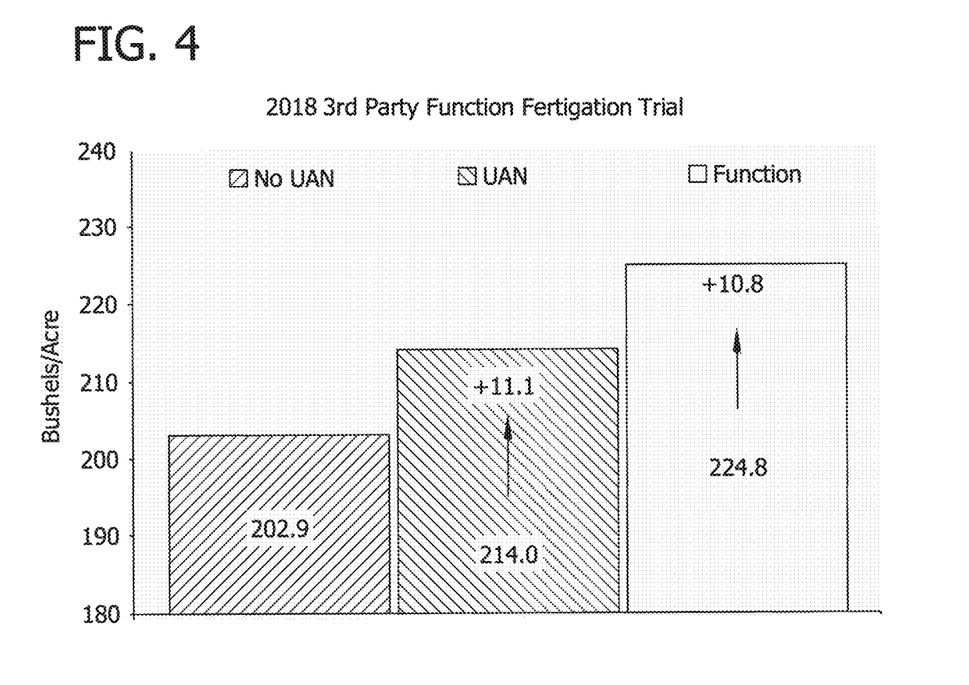
FIG. 4 represents corn crop production data for the year 2018 for a process utilizing no urea ammonium nitrate fertilizer, a process utilizing a urea ammonium nitrate fertilizer, and a process utilizing a nitrification inhibitor composition was used in combination with a urea ammonium nitrate fertilizer composition.

FIG. 4 reports the corn crop production data for the year 2018. The process comprising no urea ammonium nitrate fertilizer produced approximately 202.9 bushels per acre and the process comprising a urea ammonium nitrate fertilizer produced approximately 214.0 bushels per acre. In contrast, the process comprising a nitrification inhibitor composition was used in combination with a urea ammonium nitrate fertilizer composition produced approximately 224.8 bushels per acre. This represented a more than 10% increase in production over the process comprising no urea ammonium nitrate fertilizer and a 5% increase in production over the process only comprising a urea ammonium nitrate fertilizer.

Figure 5:
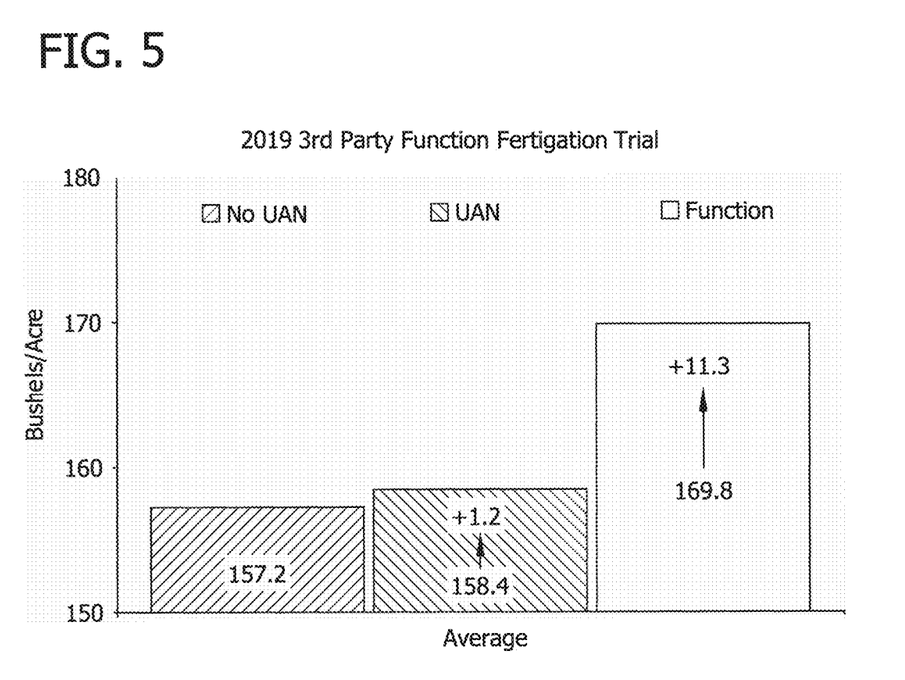
FIG. 5 represents corn crop production data for the year 2019 for a process utilizing no urea ammonium nitrate fertilizer, a process utilizing a urea ammonium nitrate fertilizer, and a process utilizing a nitrification inhibitor composition was used in combination with a urea ammonium nitrate fertilizer composition.

FIG. 5 reports the corn crop production data for the year 2019. The process comprising no urea ammonium nitrate fertilizer produced approximately 157.2 bushels per acre and the process comprising a urea ammonium nitrate fertilizer produced approximately 158.4 bushels per acre. In contrast, the process comprising a nitrification inhibitor composition was used in combination with a urea ammonium nitrate fertilizer composition produced approximately 169.8 bushels per acre. This represented an 8% increase in production over the process comprising no urea ammonium nitrate fertilizer and a more than 7% increase in production over the process only comprising a urea ammonium nitrate fertilizer.

Example 2

A further experiment was conducted in Yuma, Colorado to test pivot irrigation of the process of the present invention.

The process comprised providing a nitrification inhibitor composition comprising dicyandiamide and dimethyl sulfoxide, providing a urea ammonium nitrate fertilizer composition, combining the nitrification inhibitor composition and the urea ammonium nitrate fertilizer composition and applying the combined composition to a corn crop using pivot irrigation. Soil probe data was collected to measure both the water content and negative ions (e.g., nitrites and nitrates) during this corn crop trial. In order to evaluate the process, soil probe data was collected for a process comprising a urea ammonium nitrate fertilizer and a process comprising a urea ammonium nitrate fertilizer composition in combination with a nitrification inhibitor composition.

Figure 6:
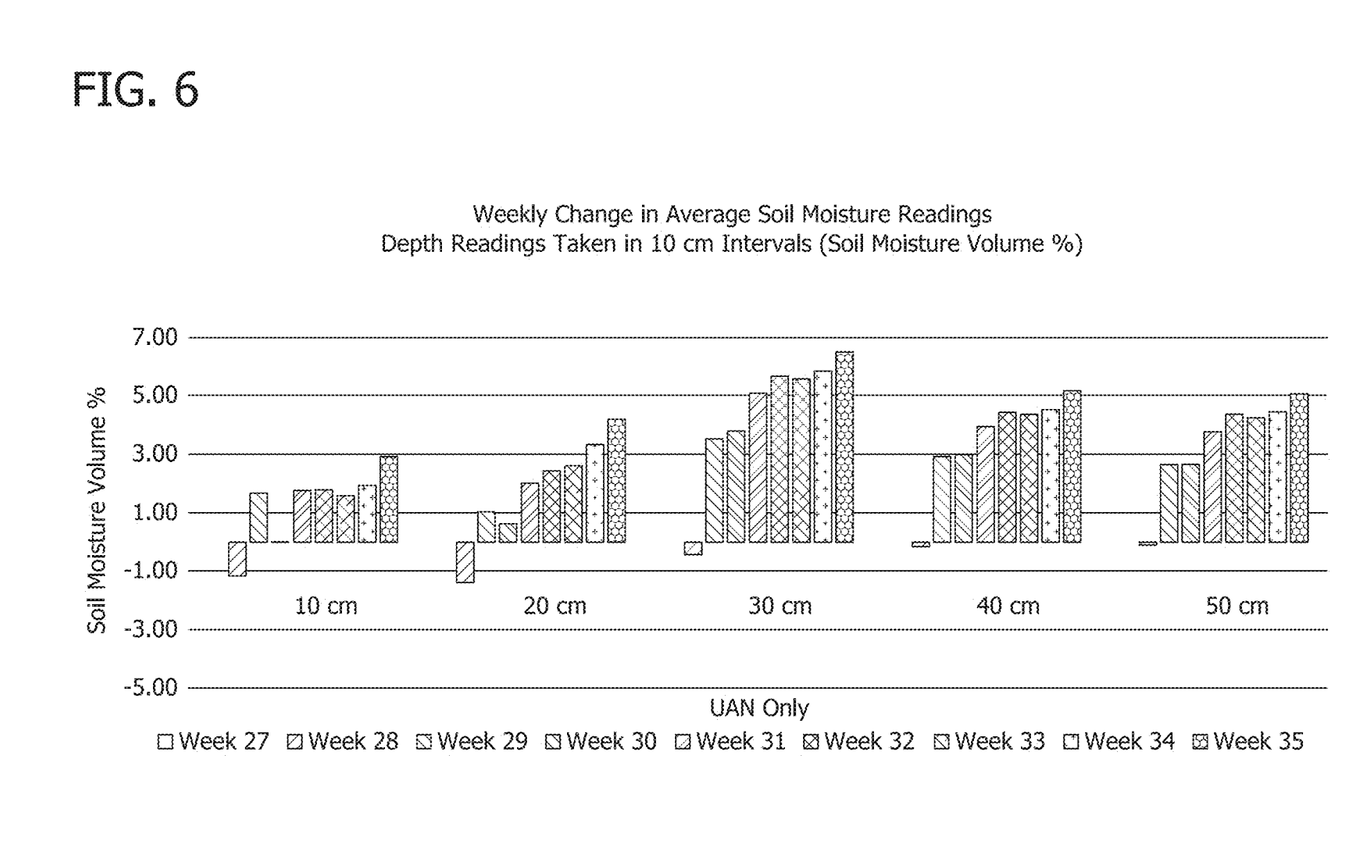
FIG. 6 represents the weekly change in average soil moisture for a process comprising a urea ammonium nitrate fertilizer.

FIG. 6 reports the weekly change in average soil moisture for a process comprising a urea ammonium nitrate fertilizer.

Figure 7:
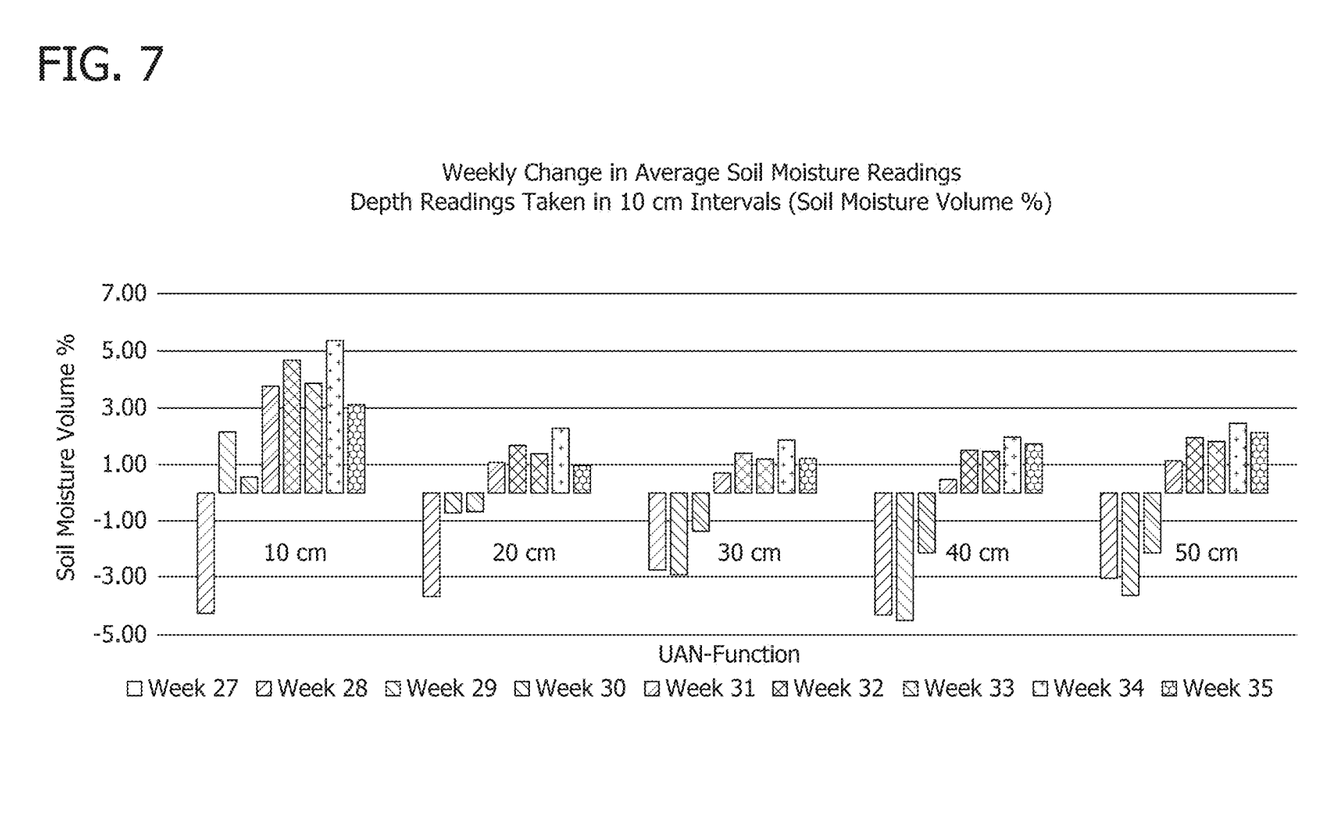
FIG. 7 represents the weekly change in average soil moisture for a process comprising a urea ammonium nitrate fertilizer composition in combination with a nitrification inhibitor composition.

FIG. 7 reports the weekly change in average soil moisture for a process comprising a urea ammonium nitrate fertilizer composition in combination with a nitrification inhibitor composition. As demonstrated in FIG. 7, a process comprising applying a urea ammonium nitrate fertilizer composition in combination with a nitrification inhibitor composition allowed for considerably less leaching of water from the top layer of the soil. For example, at a depth of 50 cm, the soil moisture for a process comprising a urea ammonium nitrate fertilizer increased to about 5 vol. %. In contrast, the process comprising a urea ammonium nitrate fertilizer composition in combination with a nitrification inhibitor composition exhibited a soil moisture at 50 cm of only about 2.13 vol. %. This demonstrates that the process comprising a urea ammonium nitrate fertilizer composition in combination with a nitrification inhibitor composition minimized leaching of the applied composition (and subsequent leaching into ground water) and also allowed for a greater percentage of the nitrogen from the applied composition to be accessible by the crop to aid in growth and development.

Example 3

Figure 8:
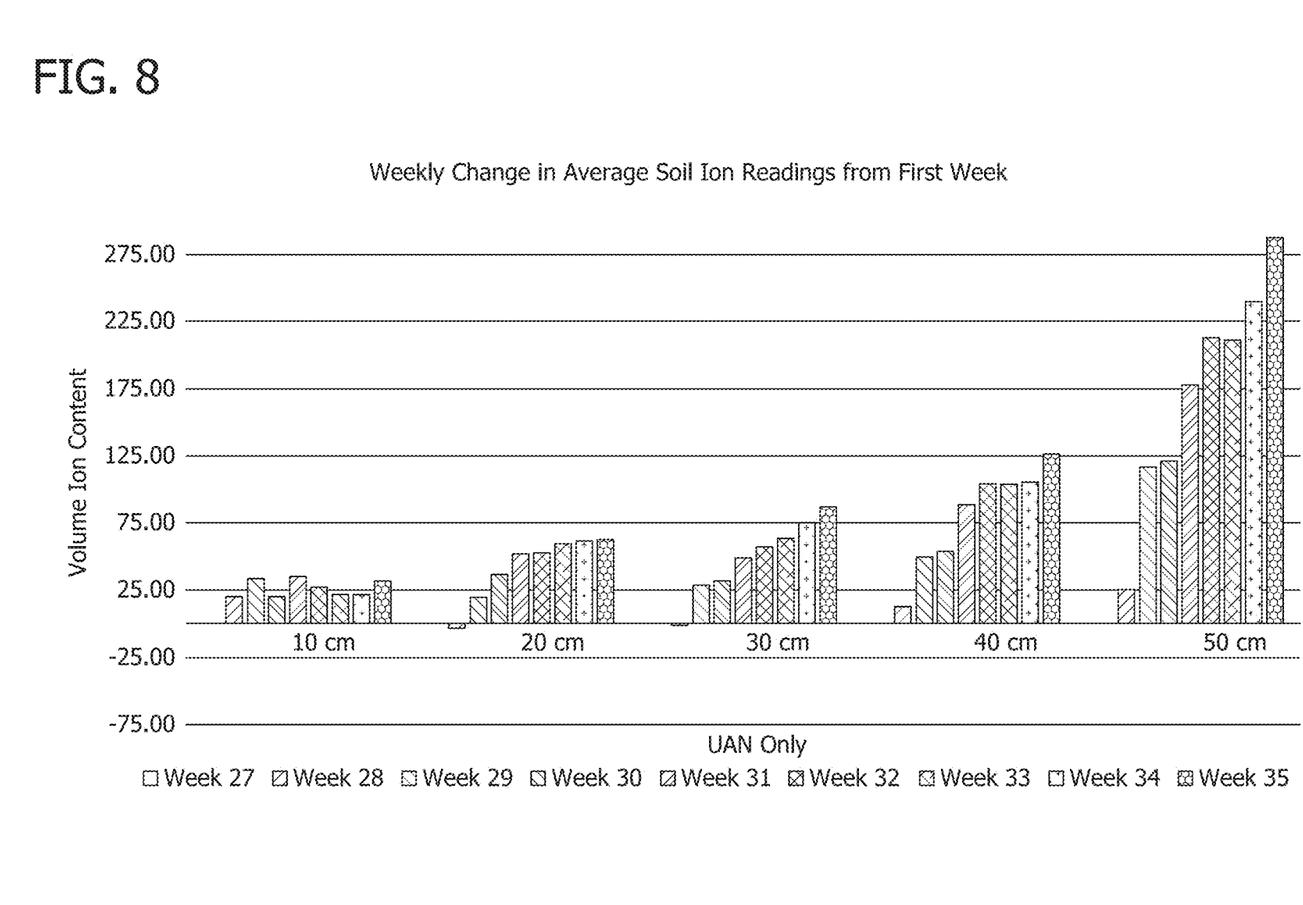
FIG. 8 represents the concentration of negative ions (e.g., nitrites and nitrates) in the soil at a particular soil depth for a process comprising a urea ammonium nitrate fertilizer.
Figure 9:
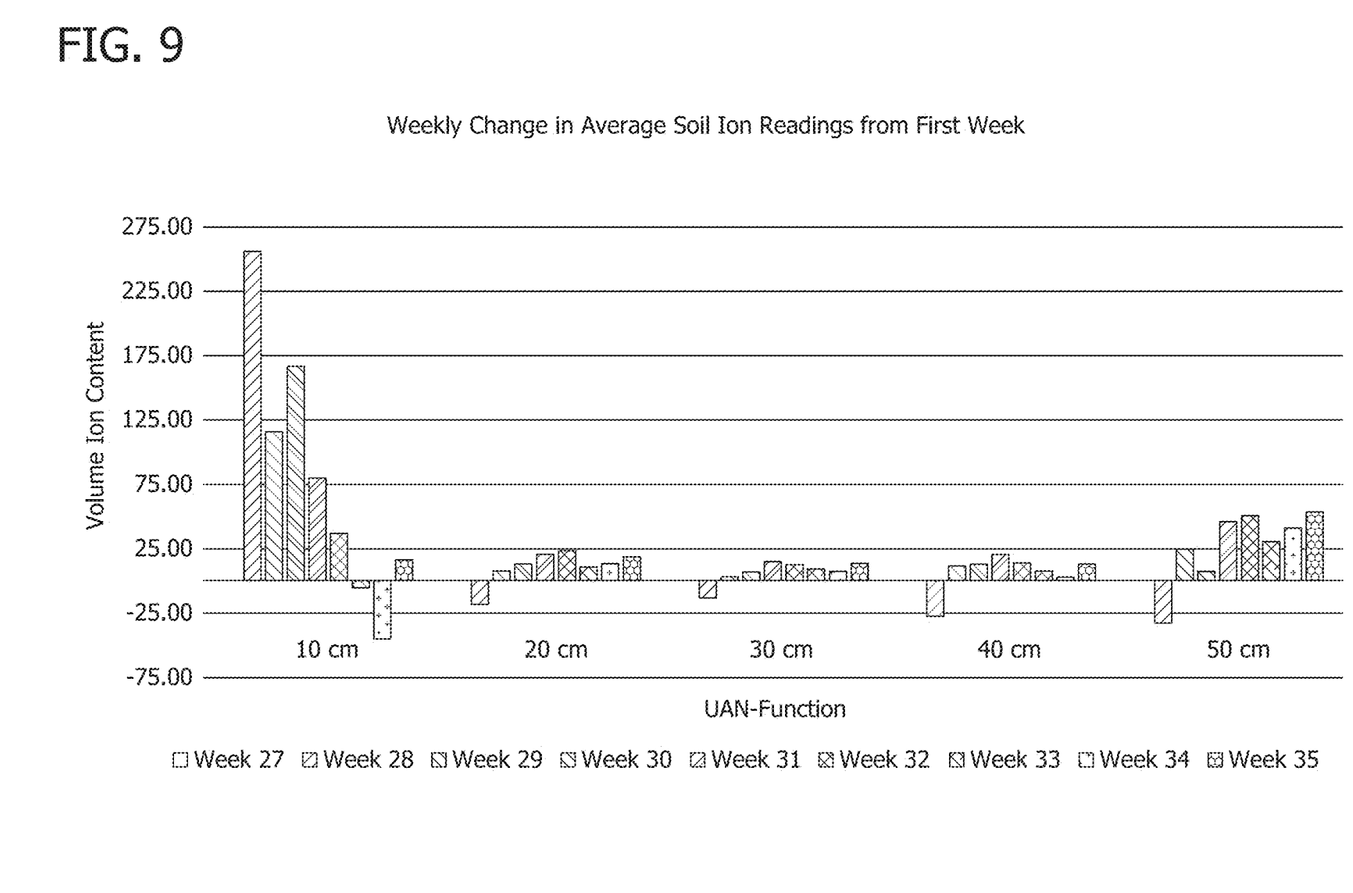
FIG. 9 represents the concentration of negative ions (e.g., nitrites and nitrates) in the soil at a particular soil depth for a process comprising a urea ammonium nitrate fertilizer composition in combination with a nitrification inhibitor composition.

Further data was collected during the experiment of Example 2, described above, in order to evaluate the concentration of negative ions (e.g., nitrites and nitrates) in the soil at a particular soil depth. FIG. 8 reports the results for a process comprising a urea ammonium nitrate fertilizer. FIG. 9 reports the results for a process comprising a urea ammonium nitrate fertilizer composition in combination with a nitrification inhibitor composition. In FIGS. 8 and 9, the data is adjusted such that the measurement at week 27 represented zero. Therefore, the ion count (vol. %) reported for subsequent weeks represents a percent change in ion content. For example, a value of 10 vol. % for week 28 would represent a 10% increase in the ion content of the soil on a volumetric basis.

As demonstrated in FIGS. 8 and 9, at a depth of 50 cm, the process comprising a urea ammonium nitrate fertilizer composition in combination with a nitrification inhibitor composition allowed for considerably less leaching of ions as compared to the process comprising a urea ammonium nitrate fertilizer.

For example, the ion content (vol. %) of the process comprising a urea ammonium nitrate fertilizer composition steadily increased at the lowest measured soil depth, with a more than ten-fold increase in ion content from week 28 to week 35. That is, over time a considerable amount of the ion of this process leached deeper into the soil, away from the useful range of the plant roots, and towards the ground water.

In contrast, the process comprising a urea ammonium nitrate fertilizer composition in combination with a nitrification inhibitor composition exhibited only a modest increase in the ion content from week 25 to week 35. This demonstrates that in the process of the present invention comprising the combination of a urea ammonium nitrate fertilizer composition and nitrification inhibitor composition, the leaching of the applied composition is drastically reduced. This allows for increased crop uptake and decreases the amount of applied composition that may eventually reach the ground water.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

What is claimed and desired to be secured by Letters Patent is as follows:

1. A fertigation process comprising:
   providing a nitrification inhibitor composition consisting essentially of dicyandiamide and dimethyl sulfoxide;
   providing a urea ammonium nitrate fertilizer composition;
   combining the nitrification inhibitor composition with the fertilizer composition; and
   applying the combined composition during a growing cycle of a corn crop using an overhead irrigation system;
   and
   wherein the combined composition consists essentially of the nitrification inhibitor composition and the fertilizer composition.

2. The process of claim 1, wherein the fertilizer composition consists essentially of the urea ammonium nitrate, a nutrient selected from the group consisting of sulfur, calcium, magnesium and potassium, and water.

3. The process of claim 2, wherein the fertilizer composition consists essentially of urea ammonium nitrate, sulfur and water.

4. The process of claim 1, wherein the fertilizer composition consists essentially of urea ammonium nitrate and water.

5. The process of claim 1, wherein the process comprises providing the nitrification inhibitor composition at a rate of from about 0.25 vol. % to about 5 vol. %, from about 0.5 vol. % to about 5 vol. %, from about 1 vol. % to about 5 vol. %, from about 2 vol. % to about 5 vol. %, from about 3 vol. % to about 5 vol. %, or from about 4 vol. % to about 5 vol. % based on the total volume applied during an irrigation cycle of the fertigation process.

6. The process of claim 1, wherein dicyandiamide comprises from about 1 wt. % to about 45 wt. %, from about 2 wt. % to about 45 wt. %, from about 3 wt. % to about 45 wt. %, from about 4 wt. % to about 45 wt. %, from about 5 wt. % to about 45 wt. %, from about 5 wt. % to about 40 wt. %, from about 10 wt. % to about 40 wt. %, from about 15 wt. % to about 40 wt. %, from about 20 wt. % to about 40 wt.

%, from about 25 wt. % to about 40 wt. %, or from about 25 wt. % to about 35 wt. % of the nitrification inhibitor composition.

7. The process of claim 1, wherein the fertilizer composition comprises the urea ammonium nitrate with a guaranteed nitrogen analysis of from about 10% to about 35%, from about 15% to about 35%, from about 20% to about 35%, from about 25% to about 35%, or from about 30% to about 35%.

8. The process of claim 2, wherein the fertilizer composition comprises the nutrient with a guaranteed nutrient analysis of from about 0.25% to about 10%, from about 5% to about 10%, from about 1% to about 10%, from about 1% to about 9%, from about 1% to about 8%, from about 1% to about 7%, from about 1% to about 6%, from about 1% to about 5%, or from about 2% to about 5%.

9. The process of claim 1, wherein the nitrification inhibitor composition is applied at a rate of from about 10 to about 15 oz., from about 11 to about 15 oz., from about 11 to about 14 oz., from about 12 to about 14 oz., or from about 12 to about 13 oz. per acre per irrigation cycle.

10. The process of claim 9, wherein the applying step comprises one irrigation cycle.

11. The process of claim 9, wherein the applying step is repeated from 1 to 10, from 1 to 9, from 1 to 8, from 1 to 7, from 1 to 6, from 1 to 5, from 1 to 4, from 1 to 3, or from 1 to 2 times during the growing cycle of the corn crop.

12. The process of claim 1, wherein the combining step comprises injecting the nitrification inhibitor composition into the irrigation system.

13. The process of claim 1, wherein the combining step comprises mixing the nitrification inhibitor composition with fertilizer composition prior to injection into the irrigation system.

14. A fertigation process comprising:
providing a nitrification inhibitor consisting essentially of comprising dicyandiamide and dimethyl sulfoxide;
providing a urea ammonium nitrate fertilizer composition;
combining the nitrification inhibitor composition with the fertilizer composition; and
applying the combined composition during a growing cycle of a corn crop using an overhead irrigation system;
and
wherein the combined composition consists essentially of the nitrification inhibitor composition and the fertilizer composition, and water.

15. The process of claim 14, wherein the fertilizer composition consists essentially of the urea ammonium nitrate, a nutrient selected from the group consisting of sulfur, calcium, magnesium and potassium, and water.

16. The process of claim 15, wherein the fertilizer composition consists essentially of urea ammonium nitrate, sulfur and water.

17. The process of claim 14, wherein the fertilizer composition consists essentially of urea ammonium nitrate and water.

18. The process of claim 14, wherein the process comprises providing the nitrification inhibitor composition at a rate of from about 0.25 vol. % to about 5 vol. %, from about 0.5 vol. % to about 5 vol. %, from about 1 vol. % to about 5 vol. %, from about 2 vol. % to about 5 vol. %, from about 3 vol. % to about 5 vol. %, or from about 4 vol. % to about 5 vol. % based on the total volume applied during an irrigation cycle of the fertigation process.

19. The process of claim 14, wherein dicyandiamide comprises from about 1 wt. % to about 45 wt. %, from about 2 wt. % to about 45 wt. %, from about 3 wt. % to about 45 wt. %, from about 4 wt. % to about 45 wt. %, from about 5 wt. % to about 45 wt. %, from about 5 wt. % to about 40 wt. %, from about 10 wt. % to about 40 wt. %, from about 15 wt. % to about 40 wt. %, from about 20 wt. % to about 40 wt. %, from about 25 wt. % to about 40 wt. %, or from about 25 wt. % to about 35 wt. % of the nitrification inhibitor composition.

20. The process of claim 14, wherein the fertilizer composition comprises the urea ammonium nitrate with a guaranteed nitrogen analysis of from about 10% to about 35%, from about 15% to about 35%, from about 20% to about 35%, from about 25% to about 35%, or from about 30% to about 35%.

21. The process of claim 15, wherein the fertilizer composition comprises the nutrient with a guaranteed nutrient analysis of from about 0.25% to about 10%, from about 5% to about 10%, from about 1% to about 10%, from about 1% to about 9%, from about 1% to about 8%, from about 1% to about 7%, from about 1% to about 6%, from about 1% to about 5%, or from about 2% to about 5%.

22. The process of claim 14, wherein the nitrification inhibitor composition is applied at a rate of from about 10 to about 15 oz., from about 11 to about 15 oz., from about 11 to about 14 oz., from about 12 to about 14 oz., or from about 12 to about 13 oz. per acre per irrigation cycle.

23. The process of claim 22, wherein the applying step comprises one irrigation cycle.

24. The process of claim 22, wherein the applying step is repeated from 1 to 10, from 1 to 9, from 1 to 8, from 1 to 7, from 1 to 6, from 1 to 5, from 1 to 4, from 1 to 3, or from 1 to 2 times during the growing cycle of the corn crop.

25. The process of claim 14, wherein the combining step comprises injecting the nitrification inhibitor composition into the irrigation system.

26. The process of claim 14, wherein the combining step comprises mixing the nitrification inhibitor composition with fertilizer composition prior to injection into the irrigation system.

* * * * *